United States Patent [19]

Funabashi et al.

[11] Patent Number: 4,674,037
[45] Date of Patent: Jun. 16, 1987

[54] DATA PROCESSING SYSTEM WITH AN ENHANCED COMMUNICATION CONTROL SYSTEM

[75] Inventors: Tsuneo Funabashi, Bunkyo; Kazuhiko Iwasaki, Kokubunji; Noboru Yamaguchi, Higashiyamato; Takanori Shimura, Kokubunji; Junichi Tatezaki, Kodaira, all of Japan

[73] Assignee: Hitachi, Ltd., Tokyo, Japan

[21] Appl. No.: 690,609

[22] Filed: Jan. 11, 1985

[30] Foreign Application Priority Data

Jan. 11, 1984 [JP] Japan ................................. 59-1909

[51] Int. Cl.[4] ............................................. G06F 15/16
[52] U.S. Cl. ................................................... 364/200
[58] Field of Search .................. 364/200 MS File

[56] References Cited

U.S. PATENT DOCUMENTS

4,164,787  8/1979  Aranguren ........................ 364/200
4,354,227  10/1982  Hays, Jr. et al. .................. 364/200

Primary Examiner—Raulfe B. Zache
Attorney, Agent, or Firm—Antonelli, Terry & Wands

[57] ABSTRACT

A data buffer is connected to the first and second processor and the first processor sends a start signal to the second processor, which responds to the start signal by reading data from a data source, such as an input/output device, and then writes the read out data into the data buffer. After conclusion of the writing operation, the second processor sends an end signal to the first processor which is admitted to start sending data stored in the buffer to a host processor after receipt of the start signal. The start signal and the end signal are provided to the second processor and the first processor respectively, after passing through a synchronizing circuit.

13 Claims, 8 Drawing Figures

DATA PROCESSING SYSTEM WITH AN ENHANCED COMMUNICATION CONTROL SYSTEM

BACKGROUND OF THE INVENTION

The present invention relates to a data processing system including a host system, an input/output device and a communication control system which operates to control data transfer between the host system and the input/output device.

In a communication control system, such as a disk controller, there are both a portion which is operated in response to a first clock signal to which the host system responds and a portion which is operated in response to a second clock signal to which an input/output device such as a disk device responds.

Figure 1:
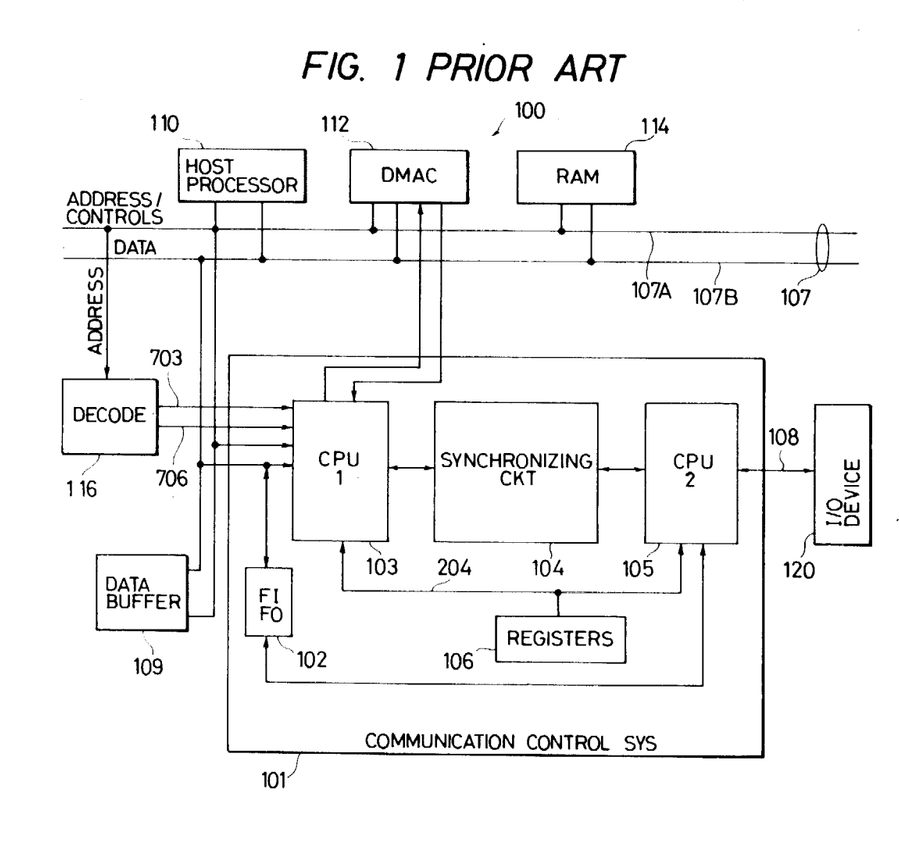
FIG. 1 is a block diagram of a prior art data processor.

FIG. 1 is an internal block diagram of a prior art data processor including such a communication control system 101 which contains a first-in first-out ("FIFO") register 102, a first processor 103, a synchronizing circuit 104, a second processor 105, and a group of registers 106. The comunication control system 101 is connected to a host system 100 by a bus 107, and to an external input/outut device 120 by a line 108.

The host system 100 includes a host processor 110, a direct memory access circuit (DMAC) 112, and a random access memory (RAM) 114. The decoder 116 is provided to decode an address on the bus 107 to start the operation of the first processor 103 when the decoded address is for the first processor.

When a macrocommand is issued from the host system 100, the first processor 103 decodes and converts it into a combination of lower-level commands, and issues each command to the second processor 105 by way of the bus 204 after it has stored in the group of registers 106 control parameters necessary for the second processor 105 to execute that command.

A start signal is provided to a synchronizing circuit 104 by the first processor 103 to order the second processor 105 to execute the command. The start signal is changed into a signal which is synchronized with the second clock signal which controls the second processor 105 by the synchronizing circuit 104 and is supplied to the second processor 105. The second processor 105 reads out the contents of the group of registers 106 and executes a command to read data from the input/output device 120 based upon the contents of the registers 106 and to write the read out data into FIFO 102, the first processor 103 starts reading data from FIFO 102 in parallel to the writing operation being performed by the second processor 105, thereby to send the read out data to the data buffer 109 by way of the bus 107. After completion of writing of a block of data into the data buffer 109, the DMAC 112 transfers the block of data to the RAM 114.

The necessity of FIFO 102 will be explained below. If we modify the circuit in FIG. 1 so that the FIFO 102 is removed and the data read out of the input/output device 120 is directly written into the data buffer 109 by way of the lines 107, the following problem will arise. During the time a block of data is being written into the data buffer 109 by the second processor 105, it may occur that the host processor 110 requires the bus 107, for example, in order to refresh RAM 114 when it is in the form of a dynamic memory. Therefore, the bus 107 cannot be used at that time for writng data into the data buffer 109. The FIFO 102 is provided so that the data sequentially read out of the input/output device 120 may be temporarily held by FIFO 102 until the bus 107 becomes available again for transmission of the read out data to the data buffer 109 on the line 107.

Therefore, the FIFO must operate at a high speed so that the read operation from the FIFO and the write operation into the FIFO must be effected in response to different clocks. This makes the circuit configuration of the FIFO complicated.

SUMMARY OF THE INVENTION

An object of the present invention is to provide a data procssing system which has a communication control system which does not need the FIFO 102 of the prior art.

In order to achieve this object, a data buffer is connected to the first and second processor and the first processor sends a start signal to the second processor, which responds to the start signal by reading data from a data source, such as an input/output device, and then writes the read out data into the data buffer. After conclusion of the writing operation, the second processor sends an end signal to the first processor.

BRIEF DESCRIPTION OF THE DRAWINGS

FIG. 6b is a circuit diagram of a flip-flop used in the circuit of FIG. 6a;

FIG. 7 is a time chart of signals generated by the circuit of FIG. 6a.

DETAILED DESCRIPTION OF THE PREFERRED EMBODIMENT

Figure 2:
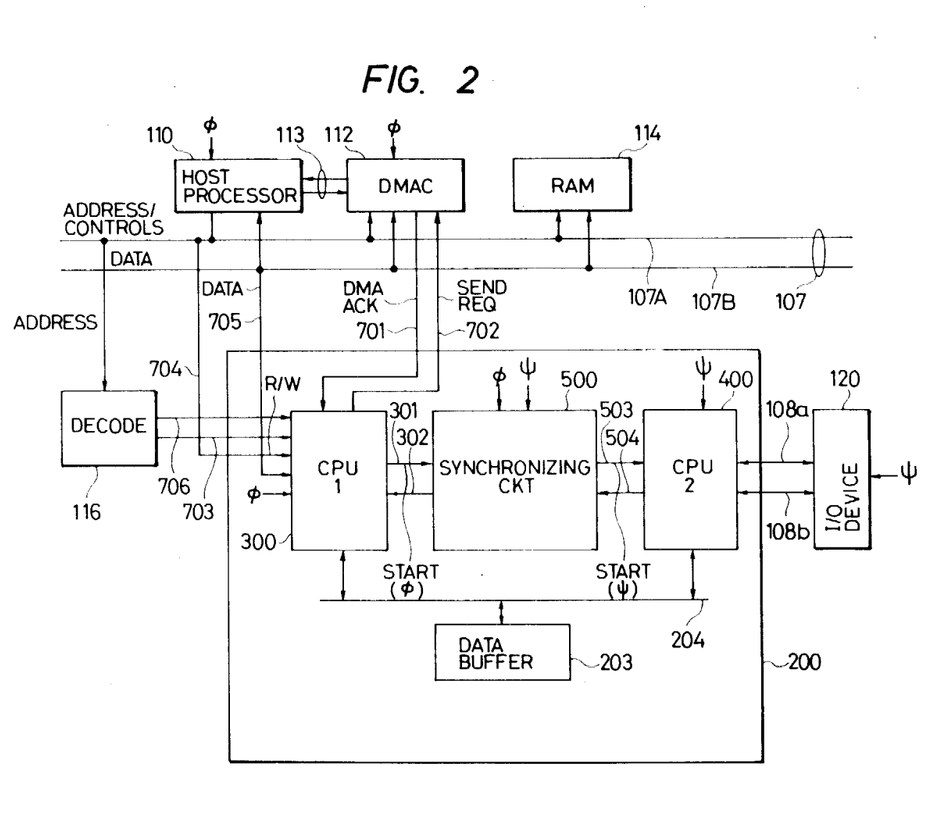
FIG. 2 is a block diagram of a data processor according to the present invention.

Referring to FIG. 2 the communication control system 2 includes a synchronizing circuit 500 and a data buffer 203 in addition to the first processor (CPU1) 300 and the second processor (CPU2) 400, both connected to the data buffer 203 by an internal bus 204.

The remaining elements in FIG. 2 which have the same reference numeral as elements in FIG. 1 are the same as the elements in FIG. 1.

CPU1 is driven by a clock which drives the host processor 110, and CPU2 is driven by a clock which drives the external input/output devices 120. Since CPU1 and CPU2 operate asynchronously, mutual handshake control signals are synchronized by the synchronizing circuit 500. CPU1 and CPU2 are both a microcomputer-type circuit. Not only data but also parameters necessary for control are transferred between CPU1 and CPU2 through the internal data bus 204 and the data buffer 203. In other words, the group of registers 106, which are required for the transfer of control parameters in the prior art system of FIG. 1, can be omitted and the control parameters are transferred using the data buffer 203.

Figure 3:
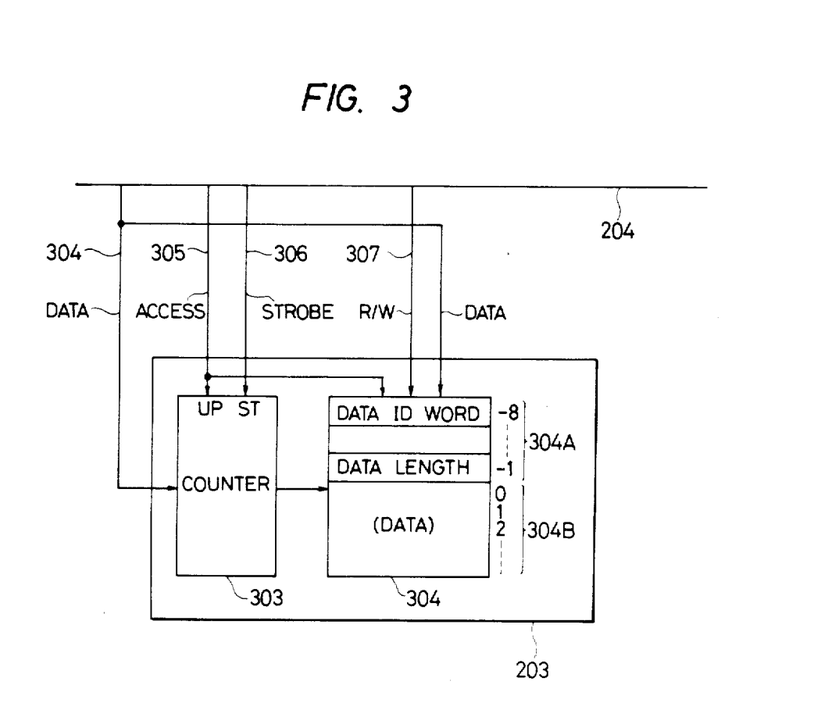
FIG. 3 is a detailed block diagram of a data buffer used in the data processor of FIG. 2.

FIG. 3 is a diagram of the essential portions of the data buffer 203, which includes an address counter 303 and a random-access memory 304. The address counter 303 is used to generate an address for accessing the RAM 304, which can be roughly divided into a control parameter storage region 304A and a data storage region 304B.

The host processor sends to CPU1 by way of the bus 107 a macrocommand as well as control parameters required in order to execute the macrocommand. CPU1 stores the control parameters into the control parameter region 304A of the data buffer 203 and then sends commands to CPU2 by way of the bus 204 to order CPU2 to perform a read operation from the input/output device 120. After sending each command CPU1 sends to the synchronizing circuit 500 a $\phi$- synchronized command execution start signal 301. The synchronizing circuit 500 then starts sending a $\phi$-synchronized busy state signal 302 to CPU1 in response to the start signal 301, and sends a $\Psi$-synchronized command execution permission signal 503 to CPU2. Herein, a $\phi$-synchronized or $\Psi$-synchronized signal means a signal synchronized with the clock $\phi$ or $\Psi$, respectively. CPU2 responds to the $\Psi$-synchronized permission signal and executes the newly received command. In the course of the execution of the command, CPU2 reads the control parameters from the control parameter region 304A of the data buffer 203, controls the input/output device 120 so that a block of data designated by the control parameters is read out of the input/output device 120, and sends the read out block of data into the data storage region 304B of the data buffer 203.

After completion of execution of each command, CPU2 sends a $\Psi$-synchronized command execution end signal 504 to the synchronizing circuit 500, which responds to this signal 504 by resetting the permission signal 503 and then resets the busy signal 302. CPU1 responds to this reset of the busy signal 302, and sends a next command to the CPU2.

After execution of all commands by CPU2, CPU1 reads out the data from the data storage region 304B of the data buffer 203 by way of the bus 204 and sends it to the host processor 110 by way of the bus 107. For this purpose, the CPU1 first sends a send request signal 702 to the DMAC 112, which responds to the signal 702 and requests the host processor 110 by way of a line 113, DMAC 112 sends an ACK signal 701 to CPU1 which responds to the ACK signal 701 and starts sending the data in the data buffer 203 byte by byte to the RAM 114 by way of the bus 107.

If the host processor 110 wants to use the bus 107 at any time, the DMAC 112 will not receive the right to use the bus 107 from the host processor 110 and therefore does not send the ACK signal 701 to the CPU1. In this case, the CPU1 refrains from sending the next data byte until the ACK signal 701 is given thereto. Thus, the data can be sent from the input/output device 120 to the RAM 114 without using the FIFO 120 (FIG. 1) in the prior art system.

Figure 4:
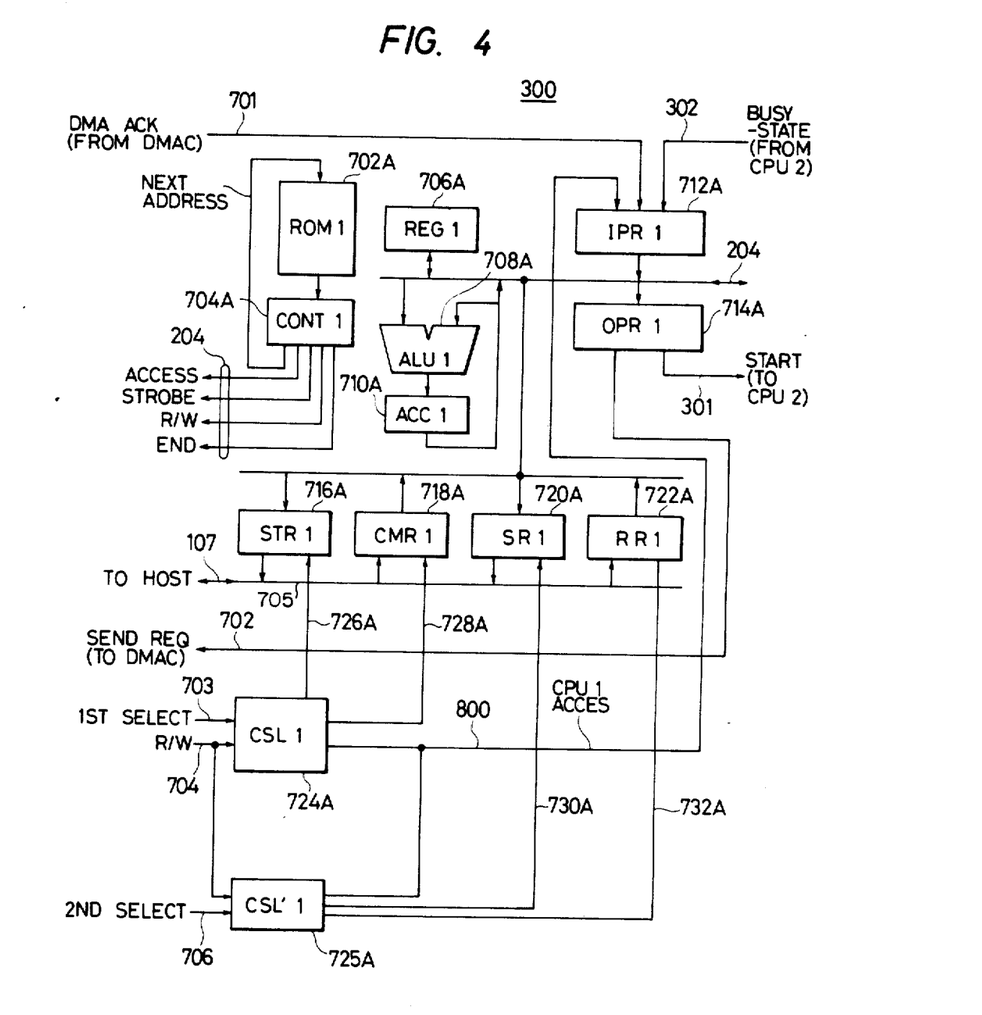
FIG. 4 is a detailed block diagam of the first processor (CPU1) used in the data processor of FIG. 2.

A diagram of the CPU1 is shown in FIG. 4. The reference numeral 702A represents a read-only memory (ROM) for holding microinstructions which control the operation of the CPU1. A control circuit (CONT1) 704A decodes the read-out microinstruction to generate a next microinstruction address and various control signals in response to various signals provided to the CPU1. The next address signal is provided to the ROM 702A. The control signals include signals to set various registers in the CPU1 and signals to be sent onto the bus 204. In FIG. 4, there are shown only those control signals sent to the data bus 204 and the next instruction address.

In FIG. 4, 706A represents a stack of plural registers, 708A represents an arithmetic or logical operation unit (ALU1), 710 represents an accumulator (ACC1), 712A represents an input register (IPR1), 714A represents an output register (OPR1), 716A represents a status register (STR1), 718A represents a command register (CMR1), 720A represents a send register (SR1), 722A represents a receive register (RR1), all of these elements being connected to the internal bus 204. The input register 712A receives the CPU1 access signal 800 from the chip select logic 724A, 725A, the DMA ACK signal 701 from DMAC 112 and the busy-state signal 302 from the synchronizing circuit 500. These signals are checked by execution of the microinstructions and the program instruction sequence is changed according to the result of the check. The output register 714A receives a command execution start signal but provided from the register 706A as a result of an execution of an instruction by way of the bus 204 to provide the command execution start signal 301 to the synchronizing circuit 500.

CPU1 is connected to the system bus 107 by means of the status register 716A, the command register 718A, the send register 720A and the receive register 722A. Chip select logic circuit 724A and 725A operate to generate a CPU1 access signal 800 which is provided to the input register 712 and indicates that CPU1 is selected by the host processor 110. The chip select logic 724A also provides a signal 726A or 728A to the status register 716A for host reading or the control register 718A for host setting, respectively. The chip select logic 725A also provides a signal 730A or 732A to the send register 720A for host reading or the receive register 722A for host setting, respectively. All circuit elements in the CPU1 operate in synchronism with the clock $\phi$. Therefore, all signals generated by the CPU1 are synchronous with the clock $\phi$, and all signals provided to the CPU1 are received in synchronism with the clock $\phi$.

Figure 5:
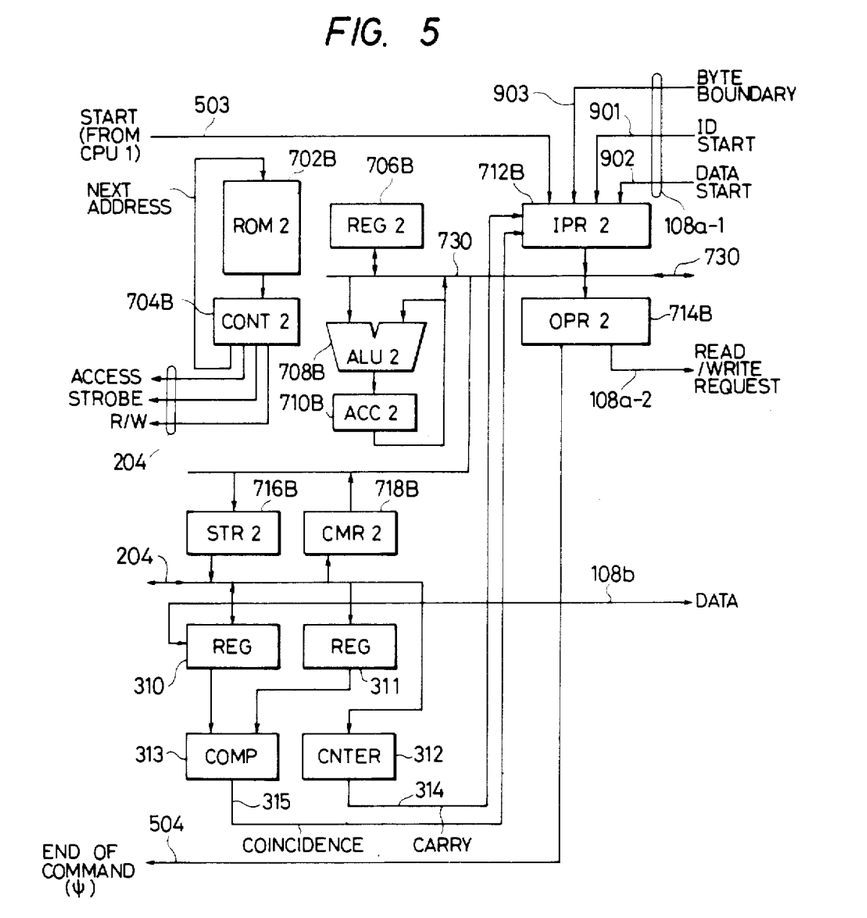
FIG. 5 is a detailed block diagram of the second processor (CPU2) used in the data processor of FIG. 2.

FIG. 5 shows a diagram of the CPU2. In FIG. 5 the reference numerals which have a character B after the numeral designate the same elements as those in FIG. 4 identified with the character A. In FIG. 5, the reference numeral 730 designates an internal bus of the CPU2 which is connected to the internal bus 204 of the communication control system 200 by way of the status register 716B and the command register 718B. CPU2 includes registers 310, 311, and a counter 312, all connected to the bus 204, and further includes a comparator 313 connected to the registers 310 and 311. These circuit elements 310 to 313 are used to control data transfer between the data buffer 203 and the input/output device 120. The register 310 receives data bits sequentially, and provides the received bits parallel to the bus 204 and vice versa. The outputs of the comparator 315 and the counter 312 as well as other signals, such as the command execution permission signal 503 and various signals provided by way of the line 108a-1 from the input/output device 120, are received by the input register 712B. The output register 714B generates a command execution end signal 504 to be sent to the synchronizing circuit 500 as well as a control signal 108a-2 to be sent to the input/output device 120. Among signals generated by the control circuit 704B, only those signals to be provided onto the bus 204 are shown in FIG. 5.

All circuit elements in CPU2 except the status register 716B and the control register 718B operate in synchronism with the clock $\Psi$. The latter two registers operate, when they are accessed in by CPU1 synchronism with the clock $\phi$, and when they are accessed by CPU2 in synchronism with the clock $\Psi$. As the essential part of CPU2 operates in synchronism with the clock $\Psi$, CPU2 will be considered generally to be operating in synchronism with the clock $\Psi$.

The structure of the data processor shown in FIG. 2 will become clearer by referring to the following explanation of the operation thereof.

(Transfer of control parameters from the host processor to the data buffer).

The host processor 110 sends a macrocommand onto the bus 107 in order to order the communication control system 200 to read data from the input/output device 120, such as a disc device. That is, the host processor sends onto the bus 107 data comprising the macrocommand, and also sends an address predeterminedly assigned in common for the status register 716A (FIG. 4) within CPU1, and a write request. Responsive to the address on the bus 109, the decoder 116 (FIG. 2) provides the first select signal 703 to the CPU1.

CPU1 also receives the write request on the bus 107 by way of a line 704, and the macrocommand by way of a line 705.

Responsive to the first select signal 703 and the write request on the line 704, the chip select logic 724A provides a set signal 728A in order to enable the macrocommand on the line 800 to be written into the control register 718A within CPU1. The chip select logic 724A also generates a CPU1 access signal 800 which is received by the input register 712A. Responsive to the signal 800, CPU1 starts a microinstruction program routine to read data from the input/output device 120. The program routine includes plural commands to be sent to CPU2 in order to control the process of reading data from the input/output device 120 by the CPU2.

Before issuing those commands, CPU1 waits for receipt of the control parameters required by CPU2 for reading data from the input/output device 120. The control parameters are provided by the host processor 110 to be written into the receive register 722A of CPU1. The host processor 110 sends onto the bus 107 data representing a control parameter, and also sends an address predeterminedly assigned in common for the send register 720A (FIG. 4) and the receive register 722A (FIG. 4) within CPU1 along with a write request.

Responsive to the address on the bus 107, the decoder 116 (FIG. 2) provides the second select signal 706 to CPU1. CPU1 responds to the signal 706 and the write request on the line 704 and receives the control parameter on the line 705 by means of the receive register 722A (FIG. 4). CPU1 sends the received control parameter to the data buffer 203, by way of the bus 204, as will be explained in more detail later on. The host processor 110 and CPU1 repeat the same operations so that plural control parameters are sent from the host processor 110 to the data buffer 203.

One of the control parameters can be a data ID word which represents a data ID word for data to be fetched which designates a feature of each data including an address of each data and is recorded in front of each data. Another control parameter can be the data length of data to be fetched. Other control parameters are used in the data processor of FIG. 2, but the details of the other control parameters will not be explained, because the details do not relate to the essence of the invention.

Writing of the control parameters into the data buffer 203 is performed as follows. In order to preset the address counter 303, after receiving the macrocommand (FIG. 3) in the data buffer 203, CPU1 outputs onto the bus 204 a predetermined header address of the control parameter storage portion 304A of the data buffer 203, and a data strobe signal onto the data bus 204. The counter 303 (FIG. 3) of the data buffer 203 responds to the data strobe signal given by the line 306 from the bus 204 and sets the header address given by the line 304 from the bus 204 therein. After that, and after receiving a control parameter from the host processor 110, CPU1 outputs the received control parameter together with a data buffer access signal and a write request to the data bus 204.

Responsive to the data buffer access signal given by the line 305 and the write request given by the line 307, RAM 304 writes data provided by the line 304 at the address location designated by the counter 303, i.e., the header address location. The RAM 304 uses a write request or a read request on the line 307 for discriminating between data reading and writing operations, and this signal is issued on the bus 204 either by CPU1 or CPU2, when they access the data buffer 203. The data buffer access signal is also provided as a count up clock to the address counter 303 by way of the line 305, so that the value of the counter 303 is incremented by 1 after each data buffer access. If the data buffer 203 is so constructed that the reading operation of the RAM 304 is executed in sequence from the largest address to the smallest address, a down counter may be used as the address counter 303.

Next, CPU1 receives the next control parameter from the host processor 110 and writes it into the data buffer 203, in a similar way by repeatedly providing onto the bus 204 the write request and the buffer access signal as well as the received control parameter. After all the control parameters are written into RAM 304, by repeating the same operation, CPU1 then re-initializes the address counter 303 with a header address indicating the control parameter storage portion 304A. As a result, CPU2 is able to read out all the control parameters without initializing the counter with the header address as will be explained later on.

In this way, CPU1 can write the control parameters in a predetermined order in sequential addresses of the control parameter storage portion 304A of the data buffer 203.

When CPU1 is engaged in an operation of sending a control parameter to the data buffer 203, CPU1 sets a busy flag in the status register 716A. The host processor 110 monitors the status register 716A, and sends the next control parameter to CPU1 after CPU1 resets the busy flag in the status register 716A.

(Data from the input/output device to the data buffer.)

Figure 7:
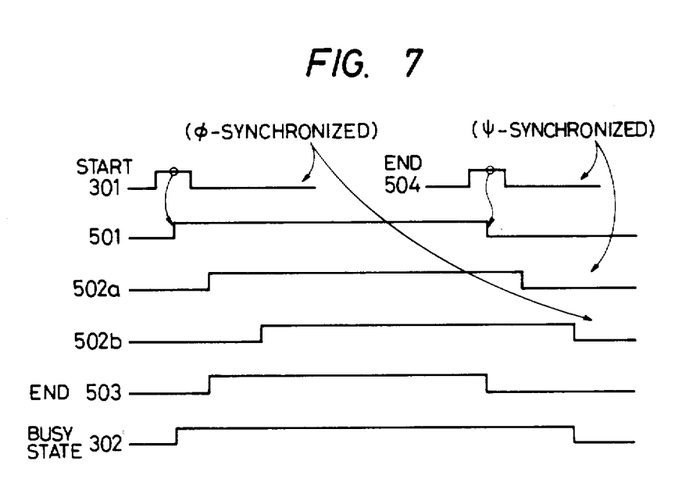

CPU1 sends the first command onto the bus 204. The command register 718B of CPU2 receives the command in response to the clock $\phi$. CPU1 then issues the command execution start signal 301 to the synchronizing circuit 500 which responds to this signal by generating a $\phi$-synchronized busy state signal 302 and then starts generating a $\Psi$-synchronized command execution permission signal, as shown in FIG. 7. Responsive to the start of the permission signal 503, CPU2 starts a microinstruction program routine in accordance with the command in the command register 718B.

In order to read data from the input/output device 120, CPU2 needs to check the data ID word indicating the feature of a data block which is received from the input/output device 120 prior to each data block, so that CPU2 can decide whether or not the data with the same data ID word as that given by the host processor 110 is following after the presently received data ID word. CPU2 must also decide the end timing of receiving data from the input/output device 120 based upon the data length given by the host processor 110, and so on. For these operations, CPU2 reads the control parameters already stored in the data buffer 203.

Responsive to the first command from CPU1, CPU2 sends a data buffer access signal and a read request onto the bus 204 so that the data buffer 203 can perform a read operation by receiving these signals by way of the lines 305 and 307 (FIG. 3), respectively.

As the address of the counter 303 (FIG. 3) is already initialized to the header address of the control storage portion 304A of the data buffer 203, the data buffer 203 reads the data ID word, and writes the read out data ID word into the register 311.

CPU2 sends to the input/output device 120 a read start signal by way of the line 108a-2 from the output register 714B so as to order the input/output device 120 to start a read operation. The input/output device 120 sends an ID start signal 901 by way of the line 108a-1 when one of the plural data ID words is going to be sent to CPU2 by way of the line 108b, and then sends a data start signal 902 when the related data is going to be sent to the CPU2 by way of the line 108b.

The input/output device 120 repeats the same operation whenever a new data ID word and a related new data is read out. It also sends a byte boundary signal 903 whenever one byte of data is read out. The register 312 stores the data ID word bit-sequentially, in response to the ID start signal 901 and the comparator 315 compares the two data ID words included in the two registers 310, 311. When the comparator 313 finds coincidence, it sends a coincidence signal 315 to the input register 712B.

When comparison is finished, CPU2 stores the output 315 of the comparator 313 into the status register 716B, and then provides the Ψ-synchronized command execution end signal 504 to the synchronizing circuit 500 from the output register 714B. Responsive to this signal 504, the synchronizing circuit 500 resets the command and execution permission signal 503 in synchronism with the clock Ψ and then resets the busy state signal 302 in synchronism with the clock Ψ, as shown in FIG. 7.

After issue of each command, CPU1 is programmed so as to check the busy state signal 302, and when the signal is reset, CPU2 performs the next operation. In the present case, CPU1 checks the content of the status register 716A in response to reset of the busy-state signal 302. If the status register 716B shows that coincidence is detected by the comparator 313, CPU1 issues the second command to be stored in the command register 718B of CPU2, and then again sends the φ-synchronized command execution start signal 301 to the synchronizing circuit 500 which again provides the Ψ-synchronized command execution permission signal 503 to CPU2 in response to the signal 301. In response to the signal 503, CPU2 reads the second command in the command register 718B to start on operation required by the second command.

During an operation of the second command, CPU2 reads the next control parameter from the data buffer 203. After end of the operation for the second command, CPU2 sets the result of the operation into the status register 716B, and provides again the command execution end signal 504. CPU1 again issues the next command. Thus, plural commands are executed by CPU2.

An operation related to the data length control will now be explained. In response to a command, CPU2 reads the data length from the data buffer 203 by sending the access signals 305 and the read request 307. The address counter 303 already indicates the last address location of the control parameter storage portion 304A of the data buffer 203 as a result of reading operations for the preceding commands. CPU2 stores the read out data length into the counter 312, and responsive to the data start signal 902 given by the input/output device 120, start to store data given by the input/output device 120 by way of the line 108b. In response to the byte boundary signal 903 provided by the input/output device 120, the CPU2 starts sending data stored sequentially in the register 310 as well as a data buffer access signal 305 and a write request 307 to the data buffer 203 by way of the bus 204 to write the data into the data portion 314B byte by byte. In this case, it is not necessary for CPU2 to write the start address of the data storage portion 314B of the data buffer 203 into the address counter 303 before CPU2 starts sending data into the data buffer 203, because the address counter 303 already holds the start address of the data storage portion 314B at this time, as is clear from the explantion given before. Therefore, the data sending operation to the data buffer 203 from the CPU2 is speeded up.

The counter 312 counts down every time the byte boundary signal 903 is provided to CPU2, and, generates a carry signal 314 when a block of data whose data length is equal to the initial value is written into the data buffer. CPU2 responds to the carry signal 314, and sends the Ψ-synchronized command execution end signal 504. In response to the rest of the busy-state signal 302 which is performed by the synchronizing circuit 500 in response to the end signal 504, CPU1 knows that writing of the block of data into the data buffer 203 is completed.

(Transfer of data from the data buffer to the host processor.)

After this, CPU1 starts an operation of sending data from the data buffer 203 to the host processor 110. For that purpose, CPU1 repeats the following operation.

First, CPU1 reads the first byte of the data in the data storage region 714B of the data buffer 203, in a similar manner as when the CPU1 writes the control parameters into the data buffer 203. CPU1 stores the read out data into the send register 720A. Then, CPU1 sends a send request 702 to the DMAC 112 from the output register 714A. The DMAC 112 sends requests to the host processor 110 by way of the line 113 to obtain a right to use the bus 107, and when the DMAC 112 receives the right from the host processor 110 by way of the line 113, the DMAC 112 sends a ACK signal 701 to the CPU1, which responds to the signal 701 and starts to send the data in the send register 720A to the RAM 114 by way of the bus 107.

After repeating the above procedure until the block of data is sent out to the host processor 110, CPU1 generates an end signal by means of the control circuit 704A and sends it the host processor 110 by way of the bus. Thus, the total operation of transferring data from the input/output device 120 to the host processor 110 is completed.

(Transfer of data from the host processor to the input-/output device.)

When the host processor 110 is controlled by a macrocommand to write data into the input/output device 120, CPU1 receives the data from the host processor 110 and stores it in the data storage portion 304B of the data buffer 203. After that, CPU1 receives the control parameters from the host processor 110 and writes them in the control parameter storage portion 304A of the data buffer 203, and issues commands to CPU2 as was done in case of reading data from the input/output device 120. CPU2 outputs the data in the data buffer 203 to the external input/output device 120, based upon the control parameters in the data buffer 203.

Figure 6A:
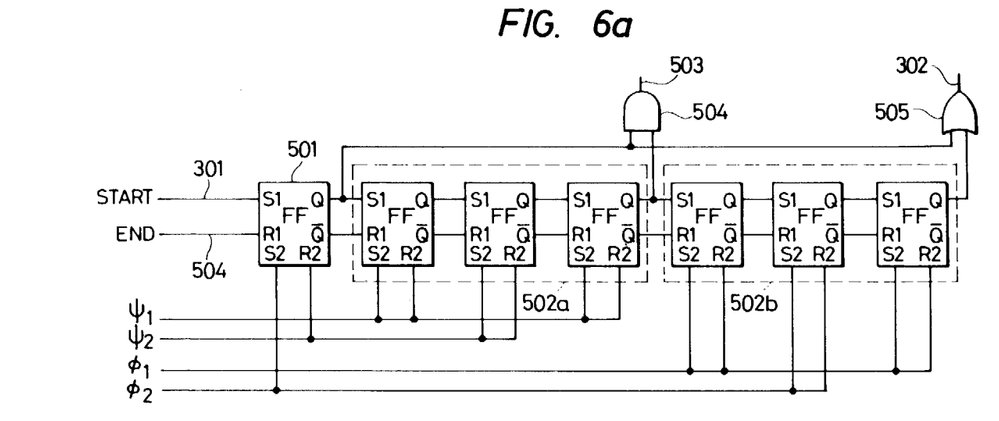
FIG. 6a is a circuit diagram of a synchronizing circuit used in the data processor of FIG. 2.
Figure 6B:
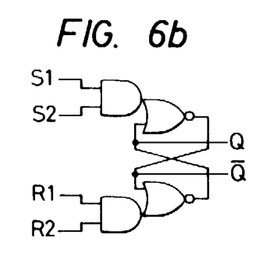

In the present embodiment, a flip-flop with two set terminals and two reset terminals, as shown in FIG. 6b, is used in the synchronizing circuit 500. A flip-flop 501 receives the command execution start signal 301 and a clock $\phi_2$ as two set signals, and the command execution end signal 504 and the clock signal $\phi_1$ as the two reset signals. The clock signals $\phi_1$ and $\phi_2$ are two-phase clock signals that are not superimposed on each other and have a first clock period, these are called "a clock $\phi$" in this embodiment. This is completely identical to the clock $\Psi$. The output of the flip-flop 501 is synchronized into a $\Psi$-synchronized command execution permission signal 503 using an AND gate 504 and a synchronizing circuit 502a composed of three flip-flop stages which receive the clocks $\Psi_1$ and $\Psi_2$ as reset and set signals, and the output of the synchronizing circuit 502a is synchronized into a $\phi$-synchronized busy-state signal 302 using an OR gate 505 and a synchronizing circuit 502b composed of three flip-flops which receive the clocks $\phi_1$ and $\phi_2$ as reset and set signals.

The output of the synchronizing circuit 502a is delayed after the signal 501, and the output of the synchronizing circuit 502b is always delayed after the signal 502a. As a result, an output signal of the OR gate 505 which receives the output signals of the circuits 501 and 502b can be used as a busy-state signal 302 indicating that CPU2 is executing a command. The signal 302 is a $\phi$-synchronized signal so that it can always be read out by CPU1. On the other hand, an output signal of the AND gate 504 which receives output signals of the circuits 501 and 502 is a $\Psi$-synchronized signal which is supplied as the command execution permission signal to CPU2. CPU2 is so constructed that it operates in accordance with the content of the command register 718B only when the signal 503 is effective.

The period during which the signal 503 is generated is contained in the period during which the signal 302 is generated, as shown in FIG. 7. That is, since the signal 302 is always generated while the signal 503 is being generated, CPU1 never judges that CPU2 has ended a command execution while it is executing a command. As is apparent from FIG. 7, moreover, the period during which the signal 302 is generated, however the frequency relationship between the clocks $\phi$ and $\Psi$ changes. As a result, the communication control system of the present invention can be applied to an external input/output device with any operating clock $\Psi$.

Thus, the data processor shown in FIG. 2 is characterized in that the data buffer 203 is used in a time series manner by CPU1 and CPU2. That is, CPU1 transfers the data in the data buffer 203 to the host system after it has read out the busy signal 302. By reading out the busy signal 302, the CPU1 can judge whether or not CPU2 is executing a command. CPU1 does not access the data buffer while CPU2 is executing a command, but accesses the data buffer 203 only when CPU2 is quiescent. Thus, series use of the data buffer 203, contention for access to the data buffer accompanying the data transfer between CPU1 and CPU2 is prevented.

Furthermore, the data processor shown in FIG. 2 is characterized in that the control parameters and the data are transferred between CPU1 and CPU2 by way of the same data buffer 203, which simplifies the circuit of the data processor.

What is claimed is:

1. A data processing system, comprising:
    data processor means connected to a first bus for processing data, including means for sending a data-send-command onto said first bus;
    data storage means connected to a second bus;
    first means connected to said first and second buses and operating in synchronism with a first clock signal, for responding to said data-send-command by generating a first signal which is synchronous with said first clock signal, and for responding to a second signal provided to said first means which is in synchronism with said first clock signal by reading out data from said data storage means by way of said second bus and transferring the read-out data onto said first bus, so that said data processor means receives said read out data;
    data source means operating in synchronism with a second clock signal for providing data to be processed by said data processor means or for receiving data processed by said data processor means;
    second means connected to said second bus and said data source means and operating in synchronism with the second clock signal for responding to a third signal provided to said second means which is synchronous with said second clock signal by reading out data from said data source means, writing said read-out data into said data storage means by way of said second bus and providing a fourth signal in synchronism with said second clock signal after writing of the read-out data; and
    third means connected to said first and second means and responsive to said first and second clock signals and said first and fourth signals for providing to said second means said third signal after receipt of said first signal and for providing to the first means said second signal after receipt of said fourth signal.

2. A data processing system according to claim 1,
    wherein said data processor means further includes means for transferring control data, which designates data to be read out of said data source means, to said first means by way of said first bus when said data-send command is sent to said first means;
    wherein said first means includes means for writing the control data in a partial region of said data storage means by way of said second bus before said first signal is generated; and
    wherein said second means includes means responsive to said third signal for reading said control data from said partial region of said data storage means and for reading out data designated by said read out control data from said data source means to write said read out data into said data storage means and to provide said fourth signal to said third means after completion of the writing of the read out data.

3. A data processing system according to claim 2, wherein said control data includes plural data elements, and said partial region of said data storage means includes successive address locations to store data elements;

wherein said writing means in said first means includes means for sequentially writing said data elements of said control data at respective address locations of said partial region of said data storage means;

wherein said second means includes means for sequentially reading out the data elements of said control data from said respective address locations of said partial region of said data storage means and for sequentially writing said data comprised of plural data elements read out of said data source means into respective address locations of a remaining region of said data storage means from an address location next to the partial region.

4. A data processing system according to claim 3, wherein at least one of said first and second means comprises a microprogram-controlled processor.

5. A data processing system according to claim 1, wherein said third means includes:

a set-reset type flip-flop connected to receive said first signal as a set signal and said fourth signal as a reset signal;

first synchronizing circuit means for synchronizing an output signal of said flip-flop by said second clock signal;

second synchronizing circuit means for synchronizing an output signal of said first synchronizing circuit means by said first clock signal;

means including an AND gate connected to receive said output signal of said flip-flop and said output signal of said first synchronizing circuit means for providing said third signal; and means including an OR gate connected to receive the output of said flip-flop and an output of said second synchronizing circuit means for providing said second signal.

6. A data processing system according to claim 5, wherein said first and second clock signals each comprise a multi-phase clock.

7. A data processing system according to claim 1, wherein said first means includes means for sending a send request to said data processor means before sending part of the data read out of said data storage means onto said first bus and for starting transfer of said part of the data after receipt of a permission signal from said data processor means, and for repeating the operation of sending the send request and transferring a part of the data so that different parts of the total data are sent in the first bus in plural steps and after receiving the permission signal for each transfer of part of the data.

8. A data processing system, comprising:

data processor means connected to a first bus for processing data, including means for sending a first command signal onto said first bus;

data storage means connected to a second bus and operating in synchronism with one of a first clock signal and a second clock signal;

first means connected to said first and second buses and operating in synchronism with the first clock signal, and sending a second command signal corresponding to the first command signal to a second means for producing a first signal;

input/output device means operating in sychronism with the second clock signal for providing data to be processed by said data processor means and for receiving data processed by said data processor means;

said second means being connected to said second bus and to said input/output device means and operating in synchronism with the second clock signal for producing a fourth signal;

third means connected to said first and second means and responsive to said first and second clock signals for producing a second signal and a third signal;

the first signal being produced when the second command signals are sent to said second means;

the second signal being produced in response to the first signal and being used to indicate that said second means is under operating status;

the third signal being responsive to the first signal and being used to start operation of said second means; and the fourth signal being produced in response to operation of said second means when the second command signals are finished and being used to negate the second and third signals.

9. A control means for data processing system including data processor means connected to a first bus for processing data including means for sending a first command signal onto said first bus, data storage means connected to a second bus and operating in synchronism with one of a first clock signal and a second clock signal, first means connected to said first and second buses and operating in sychronism with the first clock signal and sending second commands signals which correspond to the first command signal to a second means and asserting with the second clock signal for providing data to be processed by said data processor means or for receiving data to be processed by said data processor means, said second means being connected to said second bus and to said input/output device means operating in synchronism with the second clock signal, and asserting a fourth signal, comprising:

third means connected to said first and second means and responsive to the first and second clock signals for asserting a second signal and a third signal;

the first signal being asserted when the second command signals are sent to said second means;

the second signal being asserted by the first signal and being used to indicate that said second means is under operating status;

the third signal being asserted by the first signal and being used to start operation of said second means; and the fourth signal being asserted in response to operation of said second means when the second command signals are finished and being used to negate the second and third signals.

10. A data processing system, comprising:

data processor means connected to a first bus for processing data, including means for sending a data-receive-command onto said first bus;

data storage means connected to a second bus;

first means connected to said first and second buses and operating in synchronism with a first clock signal, for responding to said data-receive command by generating a first signal which is synchronous with said first clock signal, and for responding to a second signal provided to said first clock signal by writing data received from said data processor means via said first bus into said data storage means by way of said second bus and providing a third signal in synchronism with said first clock signal after writing said data;

data input/output means operable in synchronism with a second clock signal for providing data to be processed by said data processor means or for receiving data processed by said data processor means;

second means connected to said second bus and said data input/output means and operating in synchronism with the second clock signal for responding to a fourth signal provided to said second means which is synchronous with said second clock signal by reading out data from said data storage means and supplying, said read-out data to said data input-/output means; and third means connected to said first and second means and responsive to said first and second clock signals and said first and fourth signals for providing to said first means said second signal after receipt of said first signal and for providing to the second means said fourth signal after receipt of said third signal.

11. A data processing system according to claim 10, wherein said data processing means further includes means for transferring control data, which designates data to be supplied to said data input/output means, to said first means by way of said first bus when said data-receive-command is sent to said first means;

wherein said first means includes means for writing the control data in partial region of said data storage means by way of said second bus before said first signal is generated; and wherein said second means includes means responsive to said fourth signal for reading said control data from said partial region of said data storage means and for reading out data designated by said read out control data from said data storage means to supply said read out data to said data input/output means.

12. A data processing system according to claim 11, wherein said control data includes plural data elements, and said partial region of said data storage means includes successive address locations to store data elements;

wherein said writing means in said first means includes means for sequentially writing data elements of said control data at respective address locations of said partial region of said data storage means;

wherein said second means includes means for sequentially reading out the data elements of said control data from said respective address locations of said partial region of said data storage means and for sequentially writing said data comprised of plural data elements and read out of said data storage means into respective address locations of a remaining region of said data storage means from an address location next to said partial region.

13. A data processing system according to claim 12, wherein said first and second means each comprise a microprogram-controlled processor.

* * * * *